United States Patent
Lee et al.

(10) Patent No.: US 8,395,678 B2
(45) Date of Patent: Mar. 12, 2013

(54) APPARATUS AND METHOD OF REPRODUCING COLOR

(75) Inventors: Ho Jin Lee, Seoul (KR); Young Su Moon, Seoul (KR); Sang Jo Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 807 days.

(21) Appl. No.: 12/458,603

(22) Filed: Jul. 16, 2009

(65) Prior Publication Data

US 2010/0149373 A1    Jun. 17, 2010

(30) Foreign Application Priority Data

Dec. 16, 2008  (KR) .................. 10-2008-0127877

(51) Int. Cl.
- *H04N 9/73* (2006.01)
- *G06K 9/00* (2006.01)

(52) U.S. Cl. ............... 348/223.1; 348/655; 382/167

(58) Field of Classification Search ............ 348/223.1, 348/274, 222.1, 655; 382/167
See application file for complete search history.

(56) References Cited

U.S. PATENT DOCUMENTS

| | | | |
|---|---|---|---|
| 2005/0007477 A1* | 1/2005 | Ahiska | 348/335 |
| 2005/0286097 A1* | 12/2005 | Hung et al. | 358/509 |
| 2008/0204572 A1* | 8/2008 | Oizumi | 348/223.1 |
| 2010/0277610 A1* | 11/2010 | Kakkori et al. | 348/223.1 |

FOREIGN PATENT DOCUMENTS

| | | |
|---|---|---|
| JP | 2003-143623 | 5/2003 |
| KR | 10-2006-0118344 | 11/2006 |
| KR | 10-2007-0099445 | 10/2007 |
| KR | 10-0843821 | 6/2008 |

* cited by examiner

*Primary Examiner* — Aung S Moe
*Assistant Examiner* — Mekonnen Dagnew
(74) *Attorney, Agent, or Firm* — Staas & Halsey LLP

(57) ABSTRACT

A color reproduction apparatus may include a white balance performing unit to perform white balance with respect to an image obtained from a sensor using a white balance gain, an image restoring unit to restore an RGB image from the white-balanced image by interpolating a color filter array image, a first color corrector to correct a color distortion caused by a light source by applying first correction data, and a second color corrector to correct a color distortion caused by a characteristic of a sensor by applying second correction data.

19 Claims, 6 Drawing Sheets

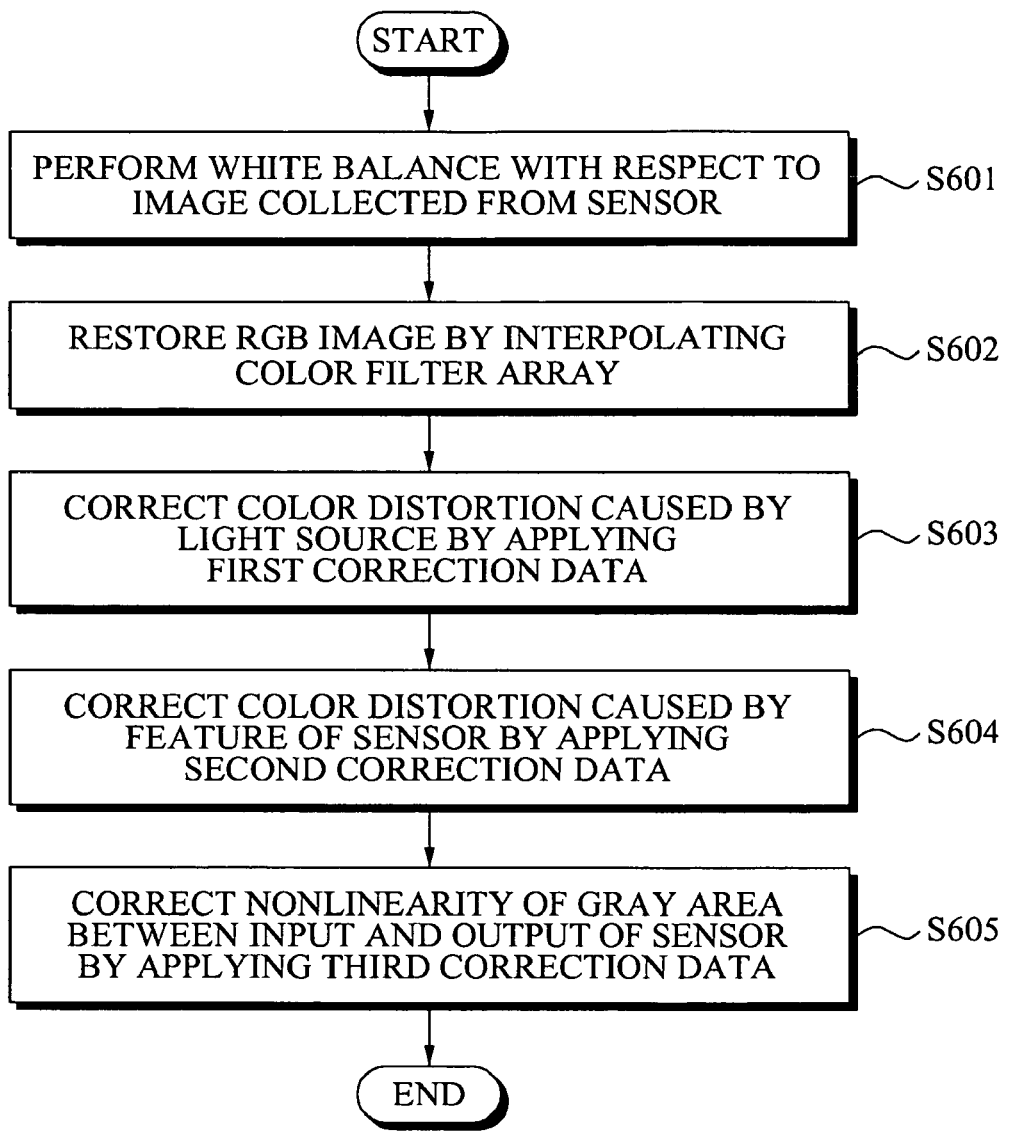

US 8,395,678 B2

APPARATUS AND METHOD OF REPRODUCING COLOR

CROSS-REFERENCE TO RELATED APPLICATION

This application claims the benefit of Korean Patent Application No. 10-2008-0127877, filed on Dec. 16, 2008, in the Korean Intellectual Property Office, the disclosure of which is incorporated herein by reference.

BACKGROUND

1. Field

Example embodiments relate to image processing, and more particularly, to an apparatus and a method that apply color correction with respect to an image obtained from a sensor to reproduce a color.

2. Description of the Related Art

As imaging devices, such as digital cameras, camcorders, and the like, come into greater use, many studies with respect to the quality of an image result are being conducted. That is, these studies are directed to obtaining an image via the imaging device and effectively restoring the image obtained by the imaging device.

Since the sensor of the imaging device may not be optimal, the image obtained by the sensor is different from an actual image. When a difference between a color of the image obtained by the sensor and a color of the actual image as seen with the eyes is significant, a user may not be satisfied with the quality of the output image. Accordingly, precise color reproduction, as though the image is seen with the eyes is required.

The color distortion may occur due to a light source and the sensor, and also may occur due to a non linearity between an input and an output of the sensor. Accordingly, an output image having improved quality may be generated by an image processing method that may eliminate the color distortion by precise color correction.

SUMMARY

According to example embodiments, there may be provided an apparatus including a white balance performing unit to perform white balance with respect to the image obtained from the sensor using a white balance gain; an image restoring unit to restore an RGB image from the white-balanced image by interpolating a color filter array image, a first color corrector to correct a color distortion caused by a light source by applying first correction data, and a second color corrector to correct a color distortion caused by a characteristic of the sensor by applying second correction data.

The apparatus may further include a gray area corrector to correct a nonlinearity of a gray area between an input and an output of the sensor by applying third correction data.

According to example embodiments, there may be provided a method including performing white balance with respect to an image obtained from a sensor using a white balance gain, restoring an RGB image from the white-balanced image including interpolating a color filter array image, correcting a color distortion caused by a light source including applying first correction data, and correcting a color distortion caused by a characteristic of the sensor including applying second correction data.

The method may further include correcting a nonlinearity of a gray area between an input and an output of the sensor including applying third correction data used for correcting.

Additional aspects will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the embodiments, taken in conjunction with the accompanying drawings of which:

FIG. 6 illustrates a flowchart of an entire process of a color reproduction method according to example embodiments.

DETAILED DESCRIPTION

Figure 1:
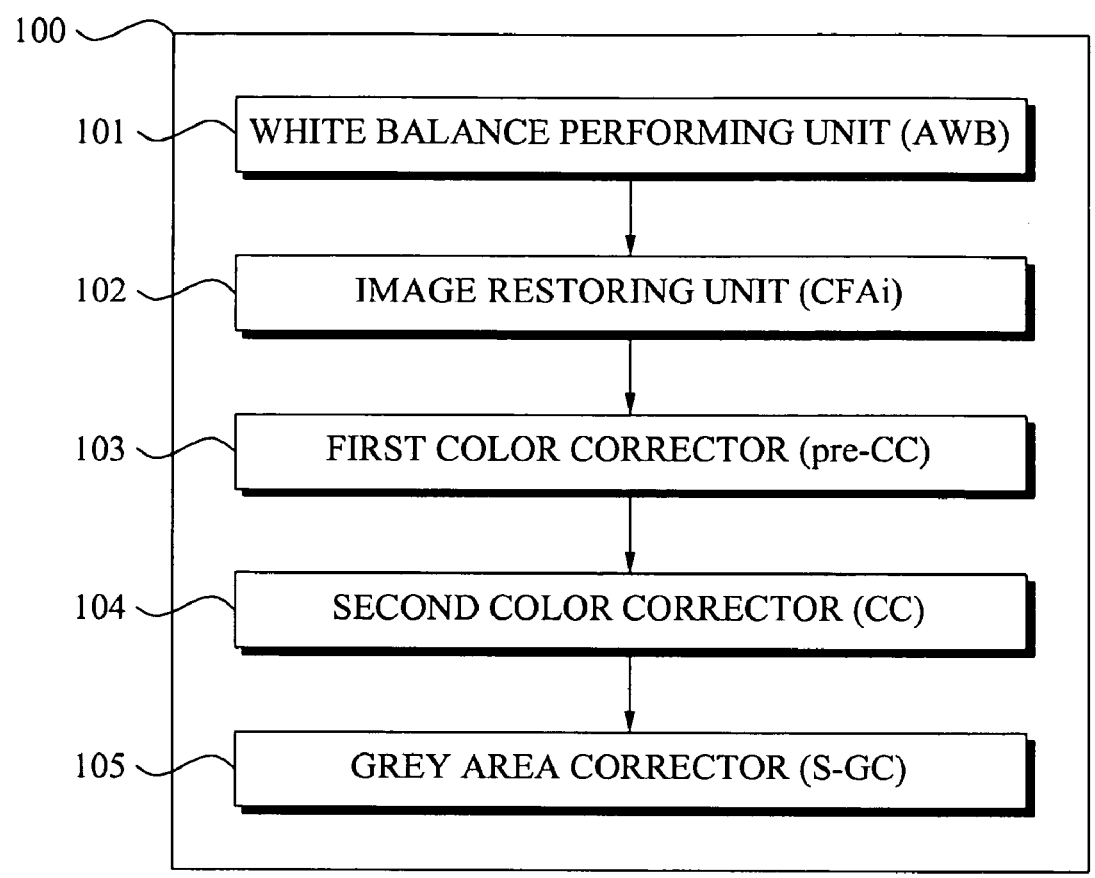
FIG. 1 illustrates a block diagram of a configuration of a color reproduction apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of a configuration of a color reproduction apparatus 100 according to example embodiments.

Referring to FIG. 1, the color reproduction apparatus 100 may include a white balance performing unit 101, an image restoring unit 102, a first color corrector 103, a second color corrector 104, and a gray area corrector 105.

The white balance performing unit 101 may perform white balance with respect to an image obtained from a sensor using a white balance gain. As an example, the white balance performing unit 101 may respectively determine a white balance gain with respect to blue and red by detecting a white area from the image. In this instance, the sensor may include a charge coupled device (CCD) sensor, a complementary metal oxide semiconductor (CMOS) sensor, and the like.

Also, the white balance performing unit 101 may perform white balance by applying the white balance gain. In this instance, the white balance gain (Kb) with respect to the blue may be determined as a ratio of an average value of green and an average value of blue of the white area. Also, the white balance gain (Kr) with respect to the red may be determined as a ratio of an average value of green and an average value of blue of the white area. When the white balance gain is determined, the white balance performing unit 101 may perform white balance with respect to pixels constituting an entire image.

The image restoring unit 102 may restore an RGB image from the white-balanced image by interpolating a color filter array image. In this instance, the image may be a Bayer image. The Bayer image may be constituted in a mosaic form constituted by raw data. Also, since the image is constituted as an eight-bit image, the Bayer image may be constituted as a gray image.

Accordingly, the image restoring unit 102 may perform interpolation of the color filter array image, thereby restoring the Bayer image as a color image through the interpolation using adjacent values according to an arrangement of the color filter.

The first color corrector 103 may correct a color distortion caused by a light source by applying first correction data.

Although there is a limit to correcting the color distortion caused by the light source by performing white balance, the color reproduction apparatus according to example embodiments may correct the color distortion caused by the light source.

The color distortion caused by the light source is a color distortion which occurs when the light source is not the same as daylight. A human may determine that a color of an object is most natural and precise under a daylight condition. In this instance, a color difference with respect to the object, which a user experiences under an artificial light source environment such as an incandescent electric lamp, a fluorescent lamp, and the like, as opposed to daylight, is referred to as the color distortion caused by the light source. Since a wavelength of light constituting an artificial light source is different from a wavelength of daylight, when the light arrives at eyes or a measuring device after reflecting from a subject, the light may be different from the daylight, and thus, the color distortion caused by the light source may occur.

The second color corrector 104 may correct a color distortion caused by a characteristic of a sensor by applying second correction data. The color distortion caused by the characteristic of the sensor may indicate a distortion which occurs when the characteristic of the sensor is not the same as human eyes. Since the characteristic of the sensor that responds to light is different from a characteristic of a standard observer defined in international Commission on Illumination (CIE), there may be a difference in a color between an image seen with human eyes and an image obtained by the sensor. The difference is referred to as a color distortion caused by the sensor.

In this instance, the second color corrector 104 may apply the second correction data with respect to an image whose color distortion caused by a light source is corrected using the white balance performing unit 101 and the first color corrector 103. Accordingly, the second correction data may be correction data when the light source is daylight.

The gray area corrector 105 may correct a non linearity of a gray area between an input and an output of the sensor by applying third correction data. The non linearity between the input and the output of the sensor may indicate a case that an amount of light arriving at the sensor and an amount of light sensed by the sensor is not linear. When an image of a gray chart in which a reflectance is linearly increased is obtained by the sensor, a brightness value of the gray chart obtained from an output end of the sensor may not be linear. As an example, the non linearity between the input and the output of the sensor may indicate a phenomenon that a darker brightness value is obtained in a dark area.

Due to the non linearity of the input and the output of the sensor, a non linearity may occur in a gray area of the image. Accordingly, the gray area corrector 105 may determine a third correction data using the gray area of the image. In this instance, the third correction data may be correction data of when the light source is daylight.

Figure 2:
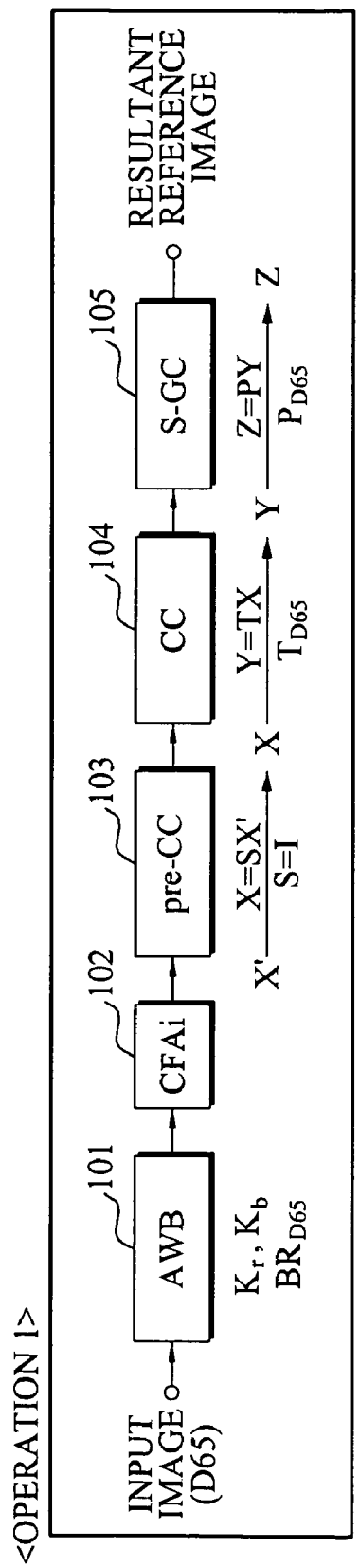
FIG. 2 illustrates a process of determining second correction data and third correction data according to example embodiments.
Figure 3:
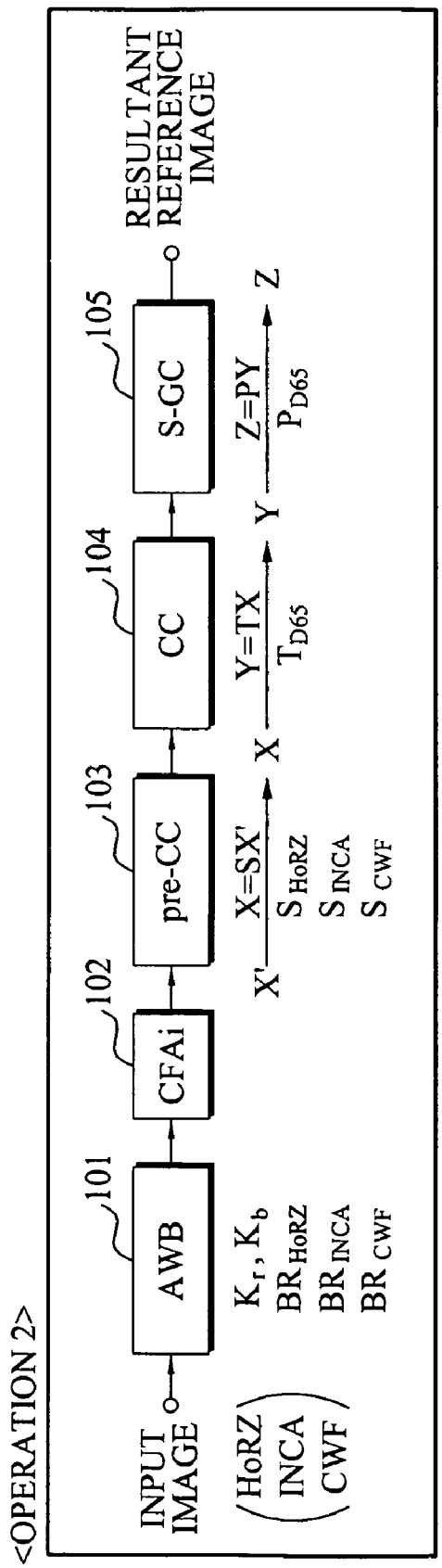
FIG. 3 illustrates a process of determining first correction data according to example embodiments.
Figure 4:
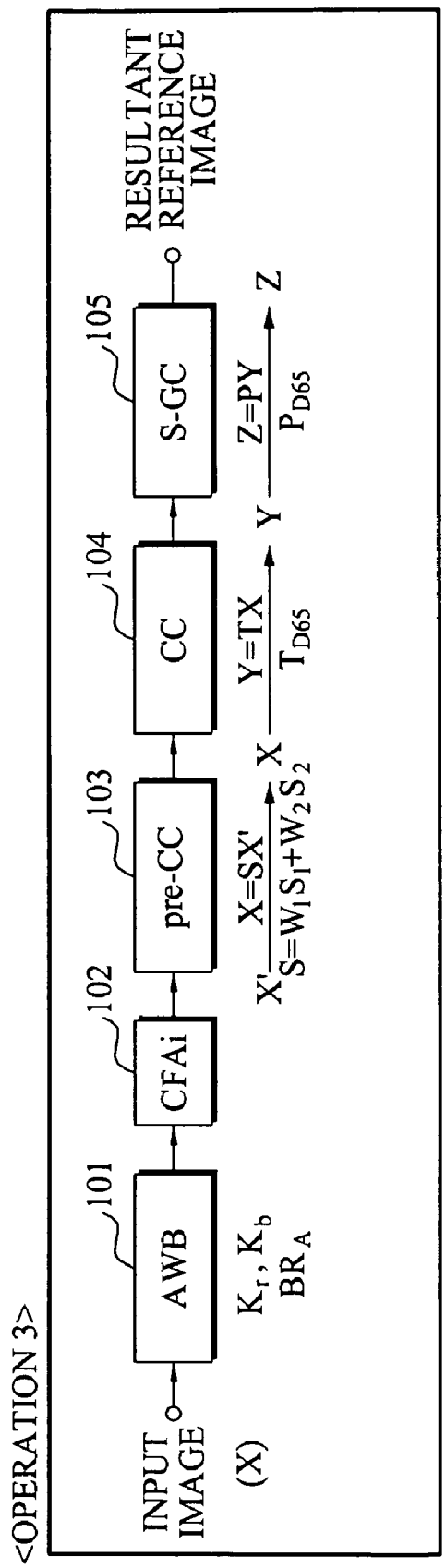
FIG. 4 illustrates a process of adjusting first correction data in a predetermined light source.

FIGS. 2 and 3 illustrate a process of determining first correction data, second correction data and third correction data with respect to a predetermined light source. Also, FIG. 4 illustrates a process of adjusting first correction data when an image affected by a predetermined light source is different from the predetermined light source.

In FIGS. 1 through 5, the white balance performing unit 101 may be defined as an auto white balance (AWB) unit 101, the image restoring unit 102 may be defined as a color filter array image (CFA) interpolation (CFAi) unit 102, the first color corrector 103 may be defined as a Pre-color correction (CC) unit 103, the second color corrector 104 may be defined as a color correction (CC) unit 104, and the gray area corrector 105 may be defined as a sensor gamma correction (S-GC) unit 105.

FIG. 2 illustrates a process (operation 1) of determining second correction data and third correction data according to example embodiments.

In operation 1, the second correction data and the third correction data may be determined. In this instance, a light source may be daylight (D65).

White balance with respect to an image may be performed by AWB 101. Also, the AWB unit 101 may calculate a B/R ratio with respect to a white area. In this instance, a B/R ratio when the light source is daylight may be determined. Here, the B/R ratio may be determined by summing an R value and a B value of the white area.

Also, the CFAi unit 102 may interpolate a color filter array image. A color image may be restored by the CFAi unit 102, and in this instance, the restored color image may be determined as X'.

When the restored color image is determined, the first correction data (S) of the Pre-CC unit 103 may be set as a unit matrix (I). Also, the second correction data (T) of the CC unit 104 and the third correction data (P) of the S-GC unit 105 may be determined based on resultant reference image which is optimal with respect to an input image.

Since the first correction data is determined as the identity matrix, a result image (X) of the Pre-CC unit 103 may be determined as X' (X=SX').

The third correction data (P) of the S-GC unit 105 may be determined based on a gray area of the input image. The third correction data may be defined as Equation 1 as given below.

$$P_{D65}: Z(i,j) = aY^2(i,j) + bY(i,j) + c$$

$$P_{D65}^{-1}: Y(i,j) = dZ^2(i,j) + eZ(i,j) + f \qquad \text{[Equation 1]}$$

Here, X is data of a resultant reference image, and Y is input data of the S-GC unit 105. That is, since Z is already determined, the third correction data (P) may be determined by a quadratic expression approximation. In this instance, $P_{D65}$ may be a look-up table (LUT) determined by the quadratic expression approximation.

Since the resultant reference image (Z) is defined as Z=PY, result data (Y) of the CC unit 104 may be determined as $Y=P^{-1}Z$. Accordingly, the second correction data (T) may be determined according to Equation 2 as given below. The second correction data may be determined as a matrix.

$$T_{D65} = YX^T(XX^T)^{-1} \qquad \text{[Equation 2]}$$

Therefore, according to operation 1, when the light source is daylight, the second correction data $T_{D65}$ of the CC unit 104 and the third correction data $P_{D65}$ of the S-GC unit 105 may be determined.

FIG. 3 illustrates a process (operation 2) of determining first correction data according to example embodiments.

In the operation 2, when a light source is a predetermined light source, the first correction data may be determined. The predetermined light source of FIG. 3 may be a horizon light (HOR), an incandescent light (INCA), or a cool white light (CWF).

The AWB unit 101 may perform white balance with respect to the predetermined light source, and may calculate a B/R ratio with respect to each light source. In this instance, a B/R ratio for each of the HOR, the INCA, and the CWF may be determined.

Also, the CFAi unit 102 may interpolate a color filter array image. A color image may be restored by the CFAi unit 102, and in this instance, the restored color image may be determined as X'.

The Pre-CC unit 103 may determine the first correction data for each predetermined light source using X obtained from Operation 1 and X' obtained from Operation 2. The first correction data may be determined as a matrix.

In this instance, the first correction data may be determined according to Equation 3 as given below.

$$S_{HOR} = X_{D65}(X'_{HOR})^{-1}$$

$$S_{INCA} = X_{D65}(X'_{INCA})^{-1}$$

$$S_{CWF} = X_{D65}(X'_{CWF})^{-1} \quad \text{[Equation 3]}$$

Here, $X_{D65}$ may be determined by the second correction data $T_{D65}$ of the CC unit 104 and the third correction data $P_{D65}$ of the S-GC unit 105 based on the resultant reference image Z.

FIG. 4 illustrates a process (operation 3) of adjusting first correction data in a predetermined light source.

Operation 3 is a process of adjusting the first correction data, when an image with respect to an external light source different from a predetermined light source is inputted.

The AWB unit 101 may perform white balance with respect to the external light source, and may calculate a B/R ratio with respect to the external light source.

A color image restored by the CFAi unit 102, X', is determined. Also, result data, X, may be determined by the second correction data $T_{D65}$ of the CC unit 104 and the third correction data $P_{D65}$ of the S-GC unit 105 based on the resultant reference image Z.

In this instance, first correction data (S) for each of a HOR, an INCA, and a CWF is determined. When the external light source is not included in the above-mentioned light sources, the Pre-CC 103 may adjust the predetermined first correction data.

If it is assumed that the first correction data with respect to the external light source is S and two light sources closest to the external light source are respectively $S_1$ and $S_2$, S may be determined according to Equation 4 as given below.

$$S = w_1 S_1 + w_2 S_2 \quad \text{[Equation 4]}$$

Here, $w_1$ and $w_2$ are determined by a curve of a B/R ratio. A process of adjusting the first correction data by determining $w_1$ and $w_2$ through the curve of the B/R ratio will be described in detail with reference to FIG. 5.

Figure 5:
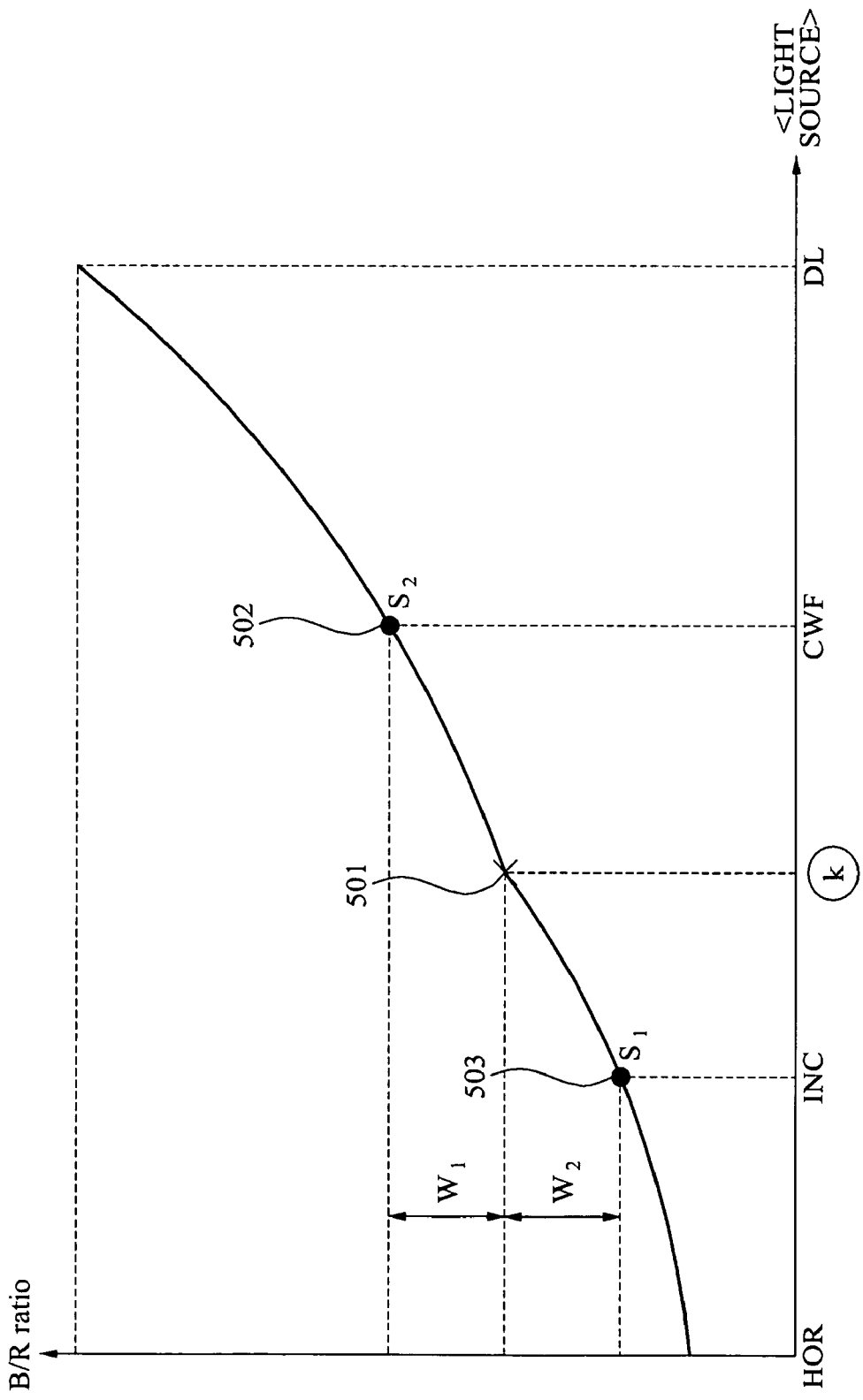
FIG. 5 illustrates a process of adjusting first correction data through an interpolation process at a curve of a B/R ratio of a predetermined light source according to example embodiments.

FIG. 5 illustrates a process of adjusting first correction data through an interpolation process at a curve of a B/R ratio of a predetermined light source according to example embodiments.

Referring to FIG. 5, a graph of a B/R ratio with respect to the light source is illustrated. A B/R ratio for each of a daylight which is a predetermined light source, a HOR, an INCA, and a CWF is determined through operation 1 and operation 2 from the AWB unit 101.

When the external light is K corresponding to a color temperature between INCA and CWF, first correction data with respect to K is positioned at a point 501 of the curve of the B/R ratio. Also, first correction data $S_{INCA}$ with respect to INCA is $S_1$ 503 and first correction data $S_{CWF}$ with respect to INCA is $S_2$ 502.

Subsequently, the first correction data (S) with respect to external light source K may be determined according to Equation 4. In this instance, $w_1$ is a B/R ratio difference between the external light source K and CWF, $w_2$ is a B/R ratio difference between the external light source K and INC. That is, S of Equation 4 is determined by interpolating $S_1$ and $S_2$.

Accordingly, the Pre-CC 103 determines first correction data with respect to an external light source using the first correction data with respect to the predetermined light source, thereby correcting a color distortion caused by a light source.

FIG. 6 illustrates a flowchart of an entire process of a color reproduction method according to example embodiments.

In operation S601, a color reproduction apparatus may perform white balance with respect to an image obtained from a sensor using a white balance gain.

In this instance, the color reproduction apparatus may respectively determine a white balance gain with respect to blue and red by detecting a white area from the image, and may perform white balance by applying the white balance gain.

Also, the color reproduction apparatus may detect a white area with respect to a predetermined at least one light source, and may determine a ratio (B/R ratio) of an average channel signal of the blue and the red. In this instance, the predetermined at least one light source may include a DL, an INCA, a CWF, or a HOR.

In operation S602, the color reproduction apparatus may restore an RGB image from the white-balanced image by interpolating a color filter array image.

In this instance, the color reproduction apparatus may restore an RGB image from a Bayer image by interpolating a color filter array image.

In operation S603, the color reproduction apparatus may correct a color distortion caused by a light source by applying first correction data. The first correction data is determined as a unit matrix, when an external light source is daylight.

When an external light source different from the predetermined at least one light source is inputted, the first correction data may be adjusted using a B/R ratio depending on the external light source. In this instance, the color reproduction apparatus may perform mapping of the B/R ratio depending on the external light source to a curve of a B/R ratio with respect to the predetermined at least one light source. Also, the color reproduction apparatus may adjust the first correction data by interpolating the first correction data based on the B/R ratio depending on the external light source, which is mapped to the curve of the B/R ratio.

In operation S604, the color reproduction apparatus may correct a color distortion caused by a characteristic of a sensor by applying second correction data.

In operation S605, the color reproduction apparatus may correct a non linearity of a gray area between an input and an output of the sensor by correcting third correction data.

The second correction data and the third correction data are data under daylight. The second correction data and the third correction data may be determined through operation 1. As an example, when the external light source is daylight, the second correction data and the third correction data may be determined based on a resultant reference image which is an optimal image of the image obtained from the sensor.

Accordingly, the color distortion caused by the light source, the color distortion caused by the characteristic of the sensor, and the non linearity of the gray area caused by the non linearity between the input and the output of the sensor eliminated from the image obtained from the sensor through operations S601 through S605, and thus, a color is effectively reproduced.

Omitted descriptions as to an example of determining first correction data, second correction data, and third correction data in a description of FIG. 6 have been described in descriptions of FIGS. 2 through 5.

According to example embodiments, a color of an image obtained from a sensor may be effectively reproduced by performing white balance together with correcting a color distortion caused by a light source.

According to example embodiments, a color of an image obtained from a sensor may be effectively reproduced by correcting a color distortion caused by a light source and a color distortion caused by a sensor.

According to example embodiments, a color of an image obtained from a sensor may be effectively reproduced by correcting a non linearity of a gray area caused by a characteristic of an input and output of the sensor.

The color reproduction method according to the above-described example embodiments may be recorded as computer-readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. An apparatus for reproducing a color of an image sensed by a sensor, the apparatus comprising: a white balance performing unit to perform white balance with respect to the image obtained from the sensor using a white balance gain; an image restoring unit to restore an RGB image from the white-balanced image by interpolating a color filter array image; a first color corrector to correct a color distortion caused by a light source by applying first correction data; and a second color corrector to correct a color distortion caused by a characteristic of the sensor by applying second correction data after the first color correction is applied.

2. The apparatus of claim 1, further comprising:
a gray area corrector to correct a nonlinearity of a gray area between an input and an output of the sensor by applying third correction data.

3. The apparatus of claim 1, wherein the white balance performing unit respectively determines the white balance gain with respect to blue and red by detecting a white area from the image, and performs the white balance by applying the white balance gain.

4. The apparatus of claim 1, wherein the white balance performing unit detects a white area with respect to the light source, and determines a ratio (B/R ratio) of an average channel signal with respect to blue and red.

5. The apparatus of claim 4, wherein the first color corrector adjusts the first correction data using the B/R ratio depending on an external light, when the external light different from light source.

6. The apparatus of claim 5, wherein the first color corrector performs mapping of the B/R ratio depending on the external light to a curve of a B/R ratio with respect to the light source, and interpolates the first correction data based on the B/R ratio according the external light, which is mapped to the curve of the B/R ratio.

7. The apparatus of claim 4, wherein the light source comprises daylight (DL), an incandescent light (INCA), a cool white light (CWF), or a horizon light (HOR).

8. The apparatus of claim 2, wherein the second correction data and the third correction data are determined based on a resultant reference image which is an optimal image of the image obtained from the sensor, when the external light the is DL.

9. The apparatus of claim 8, wherein the first correction data is determined as a unit matrix, when the external light is the DL.

10. A method for reproducing a color, the method comprising: performing white balance with respect to an image obtained from a sensor using a white balance gain; restoring an RGB image from the white-balanced image comprising interpolating a color filter array image; correcting a color distortion caused by a light source comprising applying first correction data; and correcting a color distortion caused by a characteristic of the sensor comprising applying second correction data after applying the first color correction.

11. The method of claim 10, further comprising: correcting a nonlinearity of a gray area between an input and an output of the sensor comprising applying third correction data used for correcting.

12. The method of claim 10, wherein the performing of the white balance comprises determining a white balance gain with respect to blue and red comprising detecting a white area from the image, and applying the white balance gain.

13. The method of claim 10, wherein the performing of the white balance comprises detecting a white area with respect to a light source, and determining a ratio (B/R ratio) of an average channel signal with respect to blue and red.

14. The method of claim 13, wherein the correcting of the color distortion by applying the first correction data comprises adjusting the first correction data using a B/R ratio depending on external light, when the external light is different from the predetermined at least one light source.

15. The method of claim 14, wherein the correcting of the color distortion applying the first correction data comprises mapping the B/R ratio depending on the external light to a curve of a B/R ratio with respect to the light source, and interpolates the first correction data based on the B/R ratio according the external light, which is mapped to the curve of the B/R ratio curve.

16. The method of claim 13, wherein the predetermined at least one light source comprises daylight (DL), an incandescent light (INCA), a cool white light (CWF), or a horizon light (HOR).

17. The method of claim 11, further comprising determining the second correction data and the third correction data based on a resultant reference image which is an optimal image of the image obtained from the sensor, when the external light is DL.

18. The method of claim 17, further comprising determining the first correction data as a unit matrix, when the external light is the DL.

19. A non-transitory computer readable recording medium storing a program implementing the method of claim 10.

* * * * *

UNITED STATES PATENT AND TRADEMARK OFFICE
CERTIFICATE OF CORRECTION

PATENT NO. : 8,395,678 B2  
APPLICATION NO. : 12/458603  
DATED : March 12, 2013  
INVENTOR(S) : Ho Jin Lee et al.

Page 1 of 1

It is certified that error appears in the above-identified patent and that said Letters Patent is hereby corrected as shown below:

In the Claims:

Column 8, Line 29 (Approx.), In Claim 8, delete "the is" and insert -- is the --, therefor.

Signed and Sealed this  
Seventeenth Day of September, 2013

Teresa Stanek Rea  
*Deputy Director of the United States Patent and Trademark Office*